United States Patent
Hu et al.

(10) Patent No.: US 12,233,658 B2
(45) Date of Patent: Feb. 25, 2025

(54) MULTI-PLATING-LAYER OPTICAL ANTI-COUNTERFEITING ELEMENT AND MANUFACTURING METHOD THEREOF

(71) Applicants: Zhongchao Special Security Technology Co., Ltd., Beijing (CN); China Banknote Printing and Minting Corp., Beijing (CN)

(72) Inventors: Chunhua Hu, Beijing (CN); Weiwei Zhang, Beijing (CN); Baoli Zhang, Beijing (CN); Jun Zhu, Beijing (CN)

(73) Assignees: Zhongchao Special Security Technology Co., Ltd., Beijing (CN); China Banknote Printing and Minting Corp., Beijing (CN)

( * ) Notice: Subject to any disclaimer, the term of this patent is extended or adjusted under 35 U.S.C. 154(b) by 70 days.

(21) Appl. No.: 17/598,181

(22) PCT Filed: Mar. 27, 2020

(86) PCT No.: PCT/CN2020/081589
§ 371 (c)(1),
(2) Date: Sep. 24, 2021

(87) PCT Pub. No.: WO2020/224352
PCT Pub. Date: Nov. 12, 2020

(65) Prior Publication Data
US 2024/0198712 A1    Jun. 20, 2024

(30) Foreign Application Priority Data

May 5, 2019   (CN) .......................... 201910368308.4

(51) Int. Cl.
*B42D 25/324*   (2014.01)
*B42D 25/328*   (2014.01)
(Continued)

(52) U.S. Cl.
CPC ......... *B42D 25/324* (2014.10); *B42D 25/328* (2014.10); *B42D 25/373* (2014.10); *B42D 25/45* (2014.10); *G02B 5/1857* (2013.01)

(58) Field of Classification Search
CPC .... B42D 25/324; B42D 25/328; B42D 25/45; B42D 25/373; B42D 25/30; G02B 5/1857; G02B 5/18
(Continued)

(56) References Cited

U.S. PATENT DOCUMENTS

2015/0210106 A1*   7/2015   Sun ..................... B42D 25/324
                                                  359/566

FOREIGN PATENT DOCUMENTS

CN    101952128 A    1/2011
CN    102460236 A    5/2012
(Continued)

OTHER PUBLICATIONS

Search report for Chinese application No. 201910368308.4 filed on May 5, 2019.
(Continued)

*Primary Examiner* — Justin V Lewis
(74) *Attorney, Agent, or Firm* — Dennemeyer & Associates LLC (57) ABSTRACT

An optical anti-counterfeit element includes an undulating structure layer (2); the undulating structure layer includes a first area (A) with a first microstructure and a second area (B) with a second microstructure; a structural parameter of the second microstructure is greater than a structural parameter of the first microstructure; the undulating structure layer also includes a third area (C) with a third microstructure; a structural parameter of the third microstructure is greater than the structural parameter of the second microstructure; a first plating layer (3) is arranged on the first area; a second
(Continued)

plating layer (5) is arranged on the second area; the third area is not provided with a first plating layer or a second plating layer; and viewed from one side of the optical anti-counterfeit element, the first area has an optical feature of a combination of the first microstructure and the first plating layer, the second area has an optical feature of a combination of the second microstructure and the second plating layer.

19 Claims, 5 Drawing Sheets

(51) Int. Cl.
    *B42D 25/373*     (2014.01)
    *B42D 25/45*     (2014.01)
    *G02B 5/18*     (2006.01)

(58) Field of Classification Search
    USPC .............. 283/67, 70, 72, 74, 91, 94, 98, 901
    See application file for complete search history.

(56) References Cited

FOREIGN PATENT DOCUMENTS

| | | | |
|---|---|---|---|
| CN | 102975568 | A | 3/2013 |
| CN | 103963510 | A | 8/2014 |
| CN | 10467937 | A | 5/2015 |
| CN | 104647934 | A | 5/2015 |
| CN | 104647936 | A | 5/2015 |
| CN | 105015215 | B | 11/2015 |
| CN | 106891637 | A | 6/2017 |
| DE | 112012006438 | T5 | 2/2015 |
| DE | 102016007649 | A | 12/2017 |
| WO | 2008017362 | A3 | 2/2008 |
| WO | 2010147185 | A | 12/2010 |
| WO | 2012161257 | A1 | 11/2012 |
| WO | 2016015828 | A1 | 2/2016 |
| WO | 2018103882 | A1 | 6/2018 |

OTHER PUBLICATIONS

EESR for EP application No. 20802017 mailed on Jan. 2, 2023.
International Search Report issued in connection with Application No. PCT/CN2020/081589 dated Jul. 1, 2020.

\* cited by examiner

MULTI-PLATING-LAYER OPTICAL ANTI-COUNTERFEITING ELEMENT AND MANUFACTURING METHOD THEREOF

CROSS-REFERENCE TO RELATED APPLICATION(S)

The disclosure claims priority to and the benefit of Chinese Patent Application No. 201910368308.4, filed in the China National Intellectual Property Administration (CNIPA) on 5 May 2019, which is incorporated herein by reference in its entirety.

TECHNICAL FIELD

The disclosure relates to the technical field of optical anti-counterfeiting, in particular to an optical anti-counterfeiting element and a manufacturing method of the optical anti-counterfeiting element.

BACKGROUND

In order to prevent counterfeiting generated by means of scanning, copying and the like, an optical anti-counterfeiting technology is widely adopted in various high-safety or high-added-value printed matters such as banknotes, credit cards, passports, securities and product packages, and a very good effect is achieved.

In various optical anti-counterfeiting technologies, optical effects such as diffraction and non-diffraction formed by a microstructure are widely applied due to high brightness and obvious dynamic effect. In order to increase the brightness of images, the microstructure optical anti-counterfeiting technology generally adopts a metal reflecting layer, such as aluminum. The optical anti-counterfeiting technology, namely holographic technology, which is the most widely applied to optical films at present is an optical technology developed by utilizing a diffraction effect formed by the microstructure. The holographic technology is adopted for anti-counterfeiting threads of the 5th set of 5-yuan, 10-yuan, 20-yuan, 50-yuan and 100-yuan RMB (1999 edition). In addition, a multi-layer interference optically variable technology is increasingly paid attention by people due to the fact that the multi-layer interference optically variable technology has a strong optical color-changing effect under different observation viewing angles. The multi-layer interference optically variable technology generally adopts a vapor deposition method to realize evaporation of a multi-layer interference plating layer. A classical multi-layer interference plating layer generally includes a reflecting layer, a dielectric layer and an absorbing layer. The reflecting layer is generally prepared from a high-brightness metal material, the dielectric layer is generally prepared from a transparent inorganic or organic material, and the absorbing layer is also called as a semitransparent layer and is generally prepared from a thin metal material with good absorptivity. The multi-layer interference optically variable technology is adopted by security threads of the 5th set of 100-yuan RMB (2015 edition), and magenta color is shown in orthographic observation and green color is shown in inclined observation.

If the optical microstructure, the high brightness feature of the metal reflecting layer and the multi-layer interference optically variable feature are integrated into the same optical anti-counterfeiting element, the optical anti-counterfeiting effect may be greatly enhanced. The patent application CN 200980104829.3 provides preparation of an optical anti-counterfeiting product integrating a multi-layer interference optically variable plating layer and a high-brightness metal reflecting layer through a local printing hollow process, that is, part of area has the multi-layer interference optically variable feature, part of area has the high brightness feature of the metal reflecting layer, and other areas have the perspective hollow effect. However, the precision of mutual alignment of the three areas in this patent application depends on the precision of printing, which is generally 100 um or above, so that the application in high-end anti-counterfeiting optical products is limited to a certain extent.

Therefore, the manufacturing of an optical anti-counterfeiting element which has the high brightness feature of the metal reflecting layer and the multi-layer interference optical variable feature at the same time and has zero error of mutual alignment of the two feature areas is of great significance. Furthermore, if the optical anti-counterfeiting element is further integrated with the hollow feature, and a hollowed-out area and an image area are positioned in a zero-error manner, the anti-counterfeiting performance of the product may be further improved.

SUMMARY

The embodiment of the disclosure aims at providing an optical anti-counterfeiting element and a manufacturing method thereof. Optical features shown by two different plating layers are available in reflection observation from one side of the optical anti-counterfeiting element, and areas with the two different optical features have strict zero-error positioning: particularly, the two plating layers are respectively a metal plating layer and a multi-layer interference optically variable plating layer, so that the product may show abundant high brightness feature of the metal reflecting layer (such as holography) and interference optical variable feature, and has excellent comprehensive integrated anti-counterfeiting performance; and furthermore, if the optical anti-counterfeiting element is further integrated with the hollow feature, and a hollowed-out area and an image area have zero-error positioning, the anti-counterfeiting performance of the product may be further improved.

In order to achieve the purpose, the embodiment of the disclosure provides an optical anti-counterfeiting element, which includes:

an undulating structure layer: the undulating structure layer includes a first area with a first microstructure and a second area with a second microstructure; and a structural parameter of the second microstructure is greater than a structural parameter of the first microstructure.

A first plating layer is arranged on the first area: a second plating layer is arranged on the second area: the first area has an optical feature of a combination of the first microstructure and the first plating layer; and the second area has an optical feature of a combination of the second microstructure and the second plating layer.

Since the two image areas (the first area and the second area) shown by reflection observation are determined by the microstructures, the positioning zero error feature is obtained.

In some implementation modes, the first microstructure or the second microstructure is one of a periodic structure and an aperiodic structure, or the first microstructure or the second microstructure is a combined structure of the periodic structure and the aperiodic structure.

The cross section structure of the first microstructure or the second microstructure along the extension direction is one of a flat structure, a sinusoidal structure, a rectangular grating structure, a trapezoidal grating structure, a blazed grating structure and an arc-shaped grating structure, or a structure formed by combining at least any two of the flat structure, the sinusoidal structure, the rectangular grating structure, the trapezoidal grating structure, the blazed grating structure and the arc-shaped grating structure. The size and lateral arrangement of the first microstructure and the second microstructure are determined by the desired optical effect.

In an implementation mode, a structural secondary parameter of the second microstructure is greater than a structural secondary parameter of the first microstructure: the structural parameter is a parameter selected from a depth-to-width ratio and a specific volume; and the structural secondary parameter is the remaining parameter in the depth-to-width ratio and the specific volume relative to the structural parameter.

The depth-to-width ratio of the microstructures of the undulating structure as referred to herein refers to a ratio of a depth of the undulating structure to a width of the undulating structure along the periodic (or quasi-periodic) direction: the specific volume of the undulating structure refers to a ratio of a volume of liquid which just completely covers a surface of the undulating structure to a projection area of the undulating structure on the horizontal plane when the undulating structure layer is in a horizontal state: according to the definition, the depth-to-width ratio is a dimensionless physical quantity, and a dimension of the specific volume is $um^3/um^2$: according to the definition, the flat structure is regarded as an undulating structure with the depth-to-width ratio being zero and the specific volume being zero: the depth-to-width ratio and the specific volume are two physical quantities which are not directly related in quantity: for example, if an A structure is a one-dimensional zigzag grating with the depth of 1 μm and the width of 1 um along the period direction, the depth-to-width ratio thereof is 1, and the specific volume thereof is 0.5 $um^3/um^2$: if a B structure is a one-dimensional zigzag grating with the depth of 2 μm and the width of 4 um along the period direction, the depth-to-width ratio thereof is 0.5, and the specific volume thereof is 1 $um^3/um^2$: that is, the depth-to-width ratio of the A structure is greater than the depth-to-width ratio of the B structure, and the specific volume of the B structure is greater than the specific volume of the A structure; and the differences of the depth-to-width ratios and the specific volumes of the first microstructure and the second microstructure directly determine the method adopted in a hollow process.

In an implementation mode, the structural parameter includes a depth-to-width ratio or a specific volume.

In an implementation mode, the structural parameter is a depth-to-width ratio: a range of the depth-to-width ratio of the first microstructure is greater than or equal to 0 and smaller than 0.3; and a range of the depth-to-width ratio of the second microstructure is greater than 0.2 and smaller than 0.5.

In an implementation mode, the structural parameter is a specific volume: a range of the specific volume of the first microstructure is greater than or equal to 0 $um^3/um^2$ and smaller than 0.5 $um^3/um^2$: a range of the specific volume of the second microstructure is greater than 0.4 $um^3/um^2$ and smaller than 2 $um^3/um^2$.

In some implementation modes, the first plating layer and the second plating layer are both metal reflecting plating layers and may be different metal reflecting layers (for example, the first plating layer is aluminum, and the second plating layer is copper): or the first plating layer and the second plating layer are both multi-layer interference optically variable plating layers and may be different multi-layer interference optically variable plating layers (for example, the first plating layer is a magenta-to-green interference optically variable plating layer, and the second plating layer is a green-to-blue interference optically variable plating layer); or the first plating layer is a metal reflecting plating layer and the second plating layer is a multi-layer interference optically variable plating layer: or the first plating layer is a multi-layer interference optically variable plating layer and the second plating layer is a metal reflecting plating layer.

More specifically, one of the first plating layer and the second plating layer is the metal reflecting plating layer, and the other one is the multi-layer interference optically variable plating layer. Particularly, one sub-plating layer of the first plating layer and the second plating layer may be realized by different parts of the same plating layer covering different areas, that is, part of area of the metal reflecting plating layer may belong to the sub-plating layer of the multi-layer interference optically variable plating layer.

In some implementation modes, a material of the metal reflecting plating layer includes one of aluminum, silver, copper, tin, chromium, nickel and titanium, or the material of the metal reflecting plating layer includes an alloy formed by combining at least any two of aluminum, silver, copper, tin, chromium, nickel and titanium.

More specifically, the material of the metal reflecting plating layer is aluminum.

In an implementation mode, the multi-layer interference optically variable plating includes a reflecting layer, a dielectric layer and an absorbing layer.

A material of the reflecting layer includes one of aluminum, silver, copper, tin, chromium, nickel and titanium, or an alloy formed by combining at least any two of aluminum, silver, copper, tin, chromium, nickel and titanium.

Materials of the dielectric layer include magnesium fluoride ($MgF_2$), silicon dioxide ($SiO_2$), zinc sulfide (ZnS), titanium nitride (TIN), titanium dioxide ($TiO_2$), titanium monoxide (TiO), dititanium trioxide ($Ti_2O_3$), trititanium pentoxide ($Ti_3O_5$), tantalum pentoxide ($Ta_2O_5$), niobium pentoxide ($Nb_2O_5$), cerium dioxide ($CeO_2$), bismuth trioxide ($Bi_2O_3$), chromic oxide ($Cr_2O_3$), iron oxide ($Fe_2O_3$), hafnium dioxide ($HfO_2$) or zinc oxide (ZnO); a material of the absorbing layer includes one of nickel, chromium, aluminum, silver, copper, tin and titanium, or is an alloy formed by combining at least any two of nickel, chromium, aluminum, silver, copper, tin and titanium.

More specifically, the material of the reflecting layer is aluminum; and the material of the absorbing layer is nickel or chromium or nickel-chromium alloy.

In an implementation mode, the undulating structure layer further includes: a third area with a third microstructure: a structural parameter of the third microstructure is greater than the structural parameter of the second microstructure; and the third area is not provided with a first plating layer or a second plating layer.

During transmission observation, the third area has a hollow feature relative to the first area and the second area. Therefore, during transmission observation, the third area of the optical anti-counterfeiting element has the hollow feature; that is, a hollowed-out area and an image area formed by the two plating layers have zero-error positioning, so that the anti-counterfeiting feature is more excellent.

In some implementation modes, the third microstructure is one of a periodic structure and an aperiodic structure, or the third microstructure is a combined structure of the periodic structure and the aperiodic structure.

The cross section of the third microstructure along the extension direction is one of a sinusoidal structure, a rectangular grating structure, a trapezoidal grating structure and a blazed grating structure: or a structure formed by combining at least any two of the sinusoidal structure, the rectangular grating structure, the trapezoidal grating structure and the blazed grating structure. The third microstructure is generally only configured for hollowing out and does not provide an additional optical effect, so that the third microstructure may be simplified, for example, the third microstructure is the blazed grating which is arranged in one dimension, has an isosceles triangle-shaped cross section and has the large depth-to-width ratio or the large specific volume.

In an implementation mode, the structural parameter is the depth-to-width ratio; and a range of the depth-to-width ratio of the third microstructure is greater than 0.3 and smaller than 1.

In an implementation mode, the structural parameter is the specific volume; and a range of the specific volume of the third microstructure is greater than 1 um$^3$/um$^2$ and smaller than 3 um$^3$/um$^2$.

In an implementation mode, one of the first plating layer and the second plating layer is the multi-layer interference optically variable plating layer; and the multi-layer interference optically variable plating layer includes a reflecting layer, a dielectric layer and an absorbing layer.

In an implementation mode, the third area is not provided with any of the reflecting layer, the dielectric layer or the absorbing layer. At this point, the third area is completely transparent or substantially completely transparent.

In an implementation mode, the third area is provided with the absorbing layer and the dielectric layer, and not provided with the reflecting layer. At this point, the third area is semitransparent.

The embodiment of the disclosure provides a manufacturing method of an optical anti-counterfeiting element. The manufacturing method includes:

Step S1: forming an undulating structure layer, wherein the undulating structure layer includes a first area and a second area, the first area has a first microstructure and the second area has a second microstructure, and the second microstructure has a feature that a structural parameter of the second microstructure is greater than the structural parameter of the first microstructure:

Step S2: forming a plating layer configured to obtain a first plating layer:

Step S3: forming a first protection layer:

Step S4: placing a semi-finished product formed in Step S3 in an atmosphere capable of reacting with a plating layer formed in Step S2 until part or all of the plating layer formed in Step S2 in the second area is removed, so that after the reaction is stopped, the first plating layer is obtained, and the first plating layer and the first microstructure show a combined optical feature in the first area:

Step S5: a plating layer configured to obtain a second plating layer is formed.

Specifically, in Step S1, the undulating structure layer further includes a third area, the third area has a third microstructure, and the third microstructure has a feature that a structural parameter of the third microstructure is greater than a structural parameter of the second microstructure.

Specifically, in Step S1, the second microstructure has a feature that a structural secondary parameter of the second microstructure is greater than a structural secondary parameter of the first microstructure:

the structural parameter is a parameter selected from a depth-to-width ratio and a specific volume:

the structural secondary parameter is a remaining parameter in the depth-to-width ratio and the specific volume relative to the structural parameter.

Specifically, in Step S1, the structural parameter includes the depth-to-width ratio or the specific volume.

If the plating layer on the specific microstructure is accurately removed based on the difference of the depth-to-width ratios, a protection layer needs to be formed on the plating layer by adopting a vapor deposition process: for example, the depth-to-width ratio of the first microstructure is smaller than the depth-to-width ratio of the second microstructure, a protection layer on the second microstructure is looser or more cracked than a protection layer on the first microstructure after vapor deposition of the protection layers, and thus the protection is poorer; in this way, after a certain time in a corrosive atmosphere, the plating layer on the second microstructure is removed, while the plating layer on the first microstructure is not or basically not corroded, and thus the plating layer accurately located on the first microstructure is obtained; in short, with a protection layer vapor deposition process, the plating layer accurately located on the microstructure with a small depth-to-width ratio may be obtained.

If the plating layer on the specific microstructure is accurately removed based on the difference of the specific volumes, a protection layer needs to be formed on the plating layer by adopting a coating process: for example, the specific volume of the first microstructure is smaller than the specific volume of the second microstructure, after coating of a specific amount of liquid protective glue and after leveling and drying, a minimum thickness of the protection layer on the second microstructure is smaller than a minimum thickness on the first microstructure (generally at the top of the microstructure), so that the protective glue is poorer in protection on the second microstructure and better in protection on the first microstructure: in this way, after a certain time in a corrosive atmosphere, the plating layer on the second microstructure is removed, the plating layer on the first microstructure is not or basically not corroded, and thus the plating layer accurately located on the first microstructure is obtained: in short, with a protection layer coating process, the plating layer accurately located on the microstructure with a small specific volume may be obtained.

It is apparent that if the depth-to-width ratio of the first microstructure is smaller than the depth-to-width ratio of the second microstructure, and the specific volume of the first microstructure is smaller than the specific volume of the second microstructure, the plating layer accurately located on the first microstructure may be obtained by adopting both the protection layer vapor deposition process and the protection layer coating process.

Specifically, the manufacturing method further includes:

Step S6, forming a second protection layer:

Step S7, placing a product in Step S6 in an atmosphere capable of reacting with the plating layer formed in Step S5 until part or all of the plating layer formed in Step S5 in the third area is removed, so that after the reaction is stopped, the second plating layer is obtained, the second plating layer and the second microstructure show a combined optic feature in the second area, and during transmission observation, the third area has a hollow feature relative to the first area and the second area.

Specifically, the plating layer configured to obtain the first plating layer in Step S2 is provided with an aluminum layer, or the plating layer configured to obtain the second plating layer in Step S5 is provided with an aluminum layer, or both the plating layer configured to obtain the first plating layer (3) in Step S2 and the plating layer configured to obtain the second plating layer (5) in Step S5 are provided with aluminum layers; and an atmosphere capable of reacting with the plating layer in Step S2 is selected as acid liquor or alkali liquor, or an atmosphere capable of reacting with the plating layer in Step S5 is selected as acid liquor or alkali liquor, or both the atmosphere capable of reacting with the plating layer in Step S2 and the atmosphere capable of reacting with the plating layer in Step S5 are selected as acid liquor or alkali liquor.

Specifically, the manufacturing method further includes: applying an inorganic or organic plating layer, or an inorganic or organic coating process, so that an additional optical anti-counterfeiting function or an auxiliary function is realized.

Further features and advantages of the embodiments of the disclosure will be explained in detail in the following implementation modes.

BRIEF DESCRIPTION OF THE DRAWINGS

The drawings are provided to provide a further understanding of the embodiments of the disclosure and constitute a part of this specification, and together with the following implementation modes, serve to explain the embodiments of the disclosure but do not constitute a limitation of the embodiments of the disclosure. In the drawings.

| Description of Reference Numerals |
| --- |
| 1. Substrate; |
| 2. Undulating structure layer; |
| 3. First plating layer; |
| 4. First protection layer; |
| 5. Second plating layer; |
| 51. Absorbing layer; |
| 52. Dielectric layer; |
| 53. Reflecting layer; |
| 6. Second protection layer; |
| 7. Other function coating layers; |
| A. First area; |
| B. Second area; |
| C. Third area, |

DETAILED DESCRIPTION OF THE EMBODIMENTS

The specific implementation modes of the embodiments of the disclosure will be described in detail below with reference to the drawings. It is to be understood that the specific implementation modes described herein are for the purpose of illustrating and explaining the embodiments of the disclosure only and are not intended to limit the embodiments of the disclosure.

Embodiment 1

Figure 1:
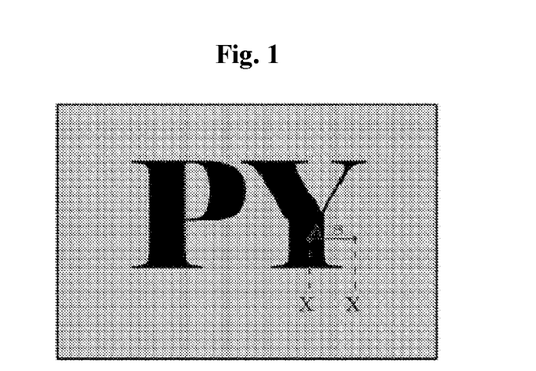
FIG. 1 is a schematic structural diagram of a top view of a first exemplary optical anti-counterfeiting element according to an embodiment of the disclosure.

As shown in FIG. 1, an optical anti-counterfeiting element includes a first area A and a second area B, the first area A has an optical feature of a combination of a first optical microstructure and a first plating layer, and the second area B has an optical feature of a combination of a second optical microstructure and a second plating layer. The two areas are strictly located. Lines of images often tend to be very fine, e.g., smaller than 50 um. Both the first plating layer and the second plating layer may be selected from a metal reflecting plating layer and a multi-layer interference optically variable plating layer.

Figure 2:
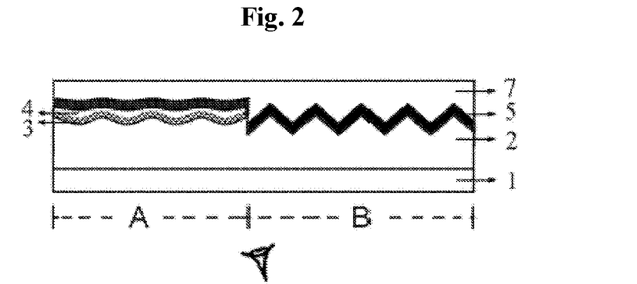
FIG. 2 is a schematic structural diagram of a cross-sectional view of the first exemplary optical anti-counterfeiting element according to an embodiment of the disclosure.

FIG. 2 is a possible schematic structural diagram of a cross-sectional view of an exemplary optical anti-counterfeiting element according to FIG. 1 along X-X. The optical anti-counterfeiting element includes a substrate 1, an undulating structure layer 2, a first plating layer 3, a first protection layer 4, a second plating layer 5 and an another function coating layer 7. The substrate 1 and the undulating structure layer 2 generally consist of a transparent material. The undulating structure layer 2 includes a first area A composed of a first microstructure and a second area B composed of a second microstructure, a depth-to-width ratio of the second microstructure is greater than a depth-to-width ratio of the first microstructure, or a specific volume of the second microstructure is greater than a specific volume of the first microstructure, or the depth-to-width ratio of the second microstructure is greater than the depth-to-width ratio of the first microstructure and the specific volume of the second microstructure is greater than the specific volume of the first microstructure. The first plating layer 3 is arranged on the first area A, and the second plating layer 5 is arranged on the second area B. Observed from the observation side (substrate side, set to be lower side) of the anti-counterfeiting element, the first area A externally shows an optical feature of a combination of the first optical microstructure and the first plating layer 3, and the second area B externally shows an optical feature of a combination of the second optical microstructure and the second plating layer 5. The first plating layer 3 is adjacent to the first protection layer 4. The first protection layer is a natural product in the manufacturing process and generally does not provide additional optical effects. More specifically, the first plating layer 3, the first protection layer 4 and the second plating layer 5 may form a functional plating layer group (typically, a multi-layer interference optically variable plating layer), and then the first area A externally shows an optical feature of a combination of the functional plating layer group and the first microstructure. At this time, the portion, belonging to the first area A, of the functional plating layer group is the 'first plating layer" that externally showing an optical effect. The other function coating layer 7 may be provided as desired, such as a bonding layer that bonds to the protected main product.

Figure 3:
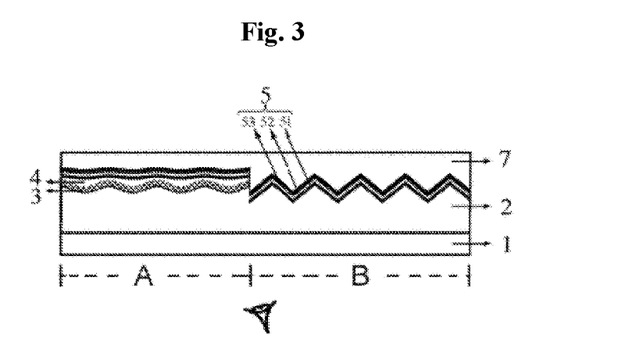
FIG. 3 is a detailed schematic structural diagram of a cross-sectional view of the first exemplary optical anti-counterfeiting element according to an embodiment of the disclosure.

FIG. 3 is another possible schematic structural diagram of a cross-sectional view of the exemplary optical anti-counterfeiting element according to FIG. 1 along X-X, and is a more specific situation of FIG. 2, namely, the first plating layer 3 is a single metal plating layer (for example, an aluminum layer), and the second plating layer 5 is a multi-layer interference optically variable plating layer. Typically, the optically variable plating layer consists of a reflecting layer 53, a dielectric layer 52 and an absorbing layer 51. Observed from the side with the absorbing layer of the optically variable plating layer, the first area A shows a feature of the single metal plating layer (such as the silver feature of the aluminum layer), and the second area B shows a feature of color change depending on an inclination angle.

Figure 4:
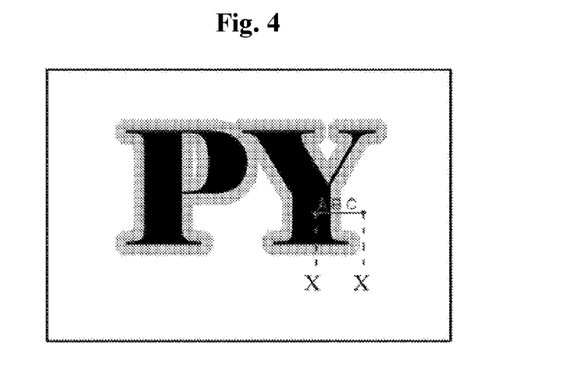
FIG. 4 is a schematic structural diagram of top view of a second exemplary optical anti-counterfeiting element according to an embodiment of the disclosure.

As shown in FIG. 4, an optical anti-counterfeiting element includes a first area A, a second area B and a third area C, the first area A has an optical feature of a combination of a first optical microstructure and a first plating layer, and the second area B has an optical feature of a combination of a second optical microstructure and a second plating layer, and the third area C has a hollowed-out feature during perspective observation. The three areas are strictly located to each other, for example, the hollowed-out area C as shown in FIG. 4 is strictly located at the boundary of the second area B. Lines of images or hollowed-out lines often tend to be very fine, e.g., smaller than 50 um. Both The first plating layer and the second plating layer may be selected from a metal reflecting plating layer and a multi-layer interference optically variable plating layer. The third area C may have no plating layer remaining and appears to be completely or substantially completely transparent (e.g., having a light transmittance greater than 90%), or may have partial plating layer remaining and appears to be semitransparent (e.g., having a light transmittance smaller than 50%).

Figure 5:
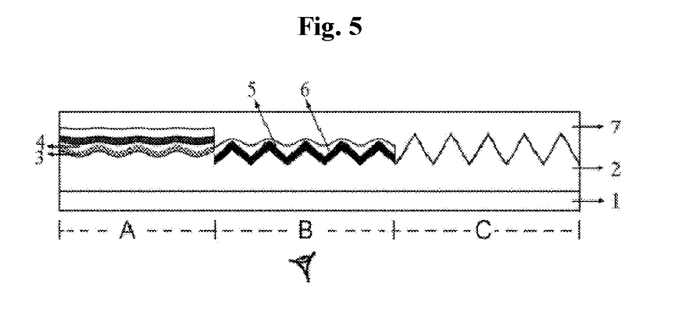
FIG. 5 is a schematic structural diagram of a cross-sectional view of the second exemplary optical anti-counterfeiting element according to an embodiment of the disclosure.

FIG. 5 is a possible schematic structural diagram of a cross-sectional view of an exemplary optical anti-counterfeiting element according to FIG. 4 along X-X. The optical anti-counterfeiting element includes a substrate 1, an undulating structure layer 2, a first plating layer 3, a first protection layer 4, a second plating layer 5, a second protection layer 6 and an other function coating layer 7. The substrate 1 and the undulating structure layer 2 generally consist of a transparent material. The undulating structure layer 2 includes a first area A composed of a first microstructure, a second area B composed of a second microstructure and a third area C composed of a third microstructure, a depth-to-width ratio of the second microstructure is greater than a depth-to-width ratio of the first microstructure, or a specific volume of the second microstructure is greater than a specific volume of the first microstructure, or the depth-to-width ratio of the second microstructure is greater than the depth-to-width ratio of the first microstructure and the specific volume of the second microstructure is greater than the specific volume of the first microstructure. A depth-to-width ratio of the third microstructure is greater than a depth-to-width ratio of the second microstructure, or a specific volume of the third microstructure is greater than the specific volume of the second microstructure, or the depth-to-width ratio of the third microstructure is greater than the depth-to-width ratio of the second microstructure and the specific volume of the third microstructure is greater than the specific volume of the second microstructure. The first plating layer 3 is arranged on the first area A, the second plating layer 5 is arranged on the second area B, and the third area C is not provided with the first plating layer or the second plating layer. Viewed from the observation side (namely, the lower side) of the anti-counterfeiting element, the first area A externally shows an optical feature of a combination of the first microstructure and the first plating layer 3, and the second area B externally shows an optical feature of a combination of the second microstructure and the second plating layer 5. The first plating layer 3 is adjacent to the first protection layer 4, and the second plating layer 5 is adjacent to the second protection layer 6. The two protection layers are natural products in the manufacturing process and generally do not provide additional optical effects. In transmission observation, the third area C appears to be completely or substantially completely transparent, and may also appear to be semitransparent with partial plating or sub-plating remaining. More specifically, the first plating layer 3, the first protection layer 4 and the second plating layer 5 may form a functional plating layer group (typically, a multi-layer interference optically variable plating layer), and then the first area A externally shows an optical feature of a combination of the functional plating layer group and the first microstructure. At this time, the portion, belonging to the first area A, of the functional plating layer group is the 'first plating layer' that externally shows an optical effect. The other function coating layer 7 may be provided as desired, such as a bonding layer that bonds to a protected main product.

Figure 6:
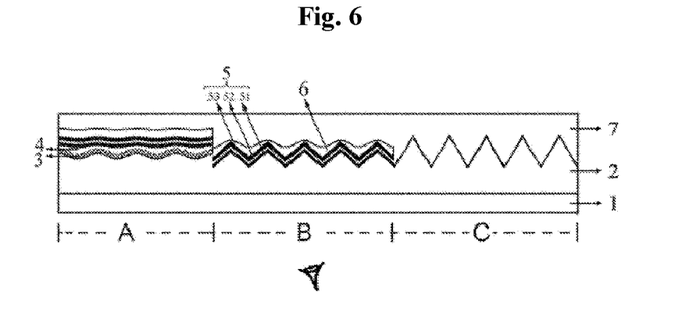
FIG. 6 is a detailed schematic structural diagram of a cross-sectional view of the second exemplary optical anti-counterfeiting element according to an embodiment of the disclosure.
Figure 7:
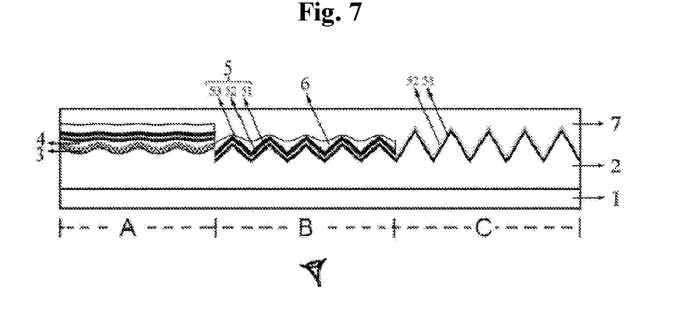
FIG. 7 is a detailed schematic structural diagram of a cross-sectional view of the second exemplary optical anti-counterfeiting element including a dielectric layer and an absorbing layer in a third area according to an embodiment of the disclosure.

FIG. 6 and FIG. 7 are another two possible schematic structural diagrams of a cross-sectional view of an exemplary optical anti-counterfeiting element according to FIG. 1 along X-X, and are more specific situations of FIG. 5, namely, the first plating layer 3 is a single metal plating layer (for example, an aluminum layer), and the second plating layer 5 is a multi-layer interference optically variable plating layer. Typically, the optically variable plating layer consists of a reflecting layer 53, a dielectric layer 52 and an absorbing layer 51. Viewed from one side with the absorbing layer of the optically variable plating layer, the first area A shows an feature of the single metal plating layer (such as the silver feature of the aluminum layer), and a second area B shows an feature of color change depending on an inclination angle. If the third area C is not provided with an aluminum layer or any plating layer sub-plating layer in the optically variable plating layer, perspective observation is carried out, and the third area C appears to be completely transparent or substantially completely transparent, as shown in FIG. 6. If the third area C has a sub-plating layer (generally the absorbing layer 51 and the dielectric layer 52) in the optically variable plating layer, perspective observation is carried out, the third area C appears to be semitransparent, as shown in FIG. 7.

A method for manufacturing an anti-counterfeiting element as shown in FIG. 1 according to the disclosure will be described below in combination with FIGS. 8-12. The method includes Steps S1 to S5. For simplicity of description, a first plating layer is selected to be a single metal plating layer, a second plating layer is selected to be a multi-layer interference optically variable plating layer, namely, the optical anti-counterfeiting element with the schematic structural diagram of a cross-sectional view as shown in FIG. 3.

Figure 8:
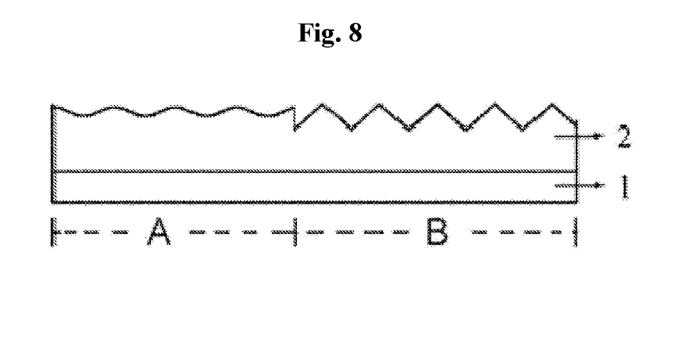
FIG. 8 is a schematic structural diagram of a cross-sectional view of the first exemplary optical anti-counterfeiting element after forming an undulating structure layer according to an embodiment of the disclosure.

Step S1: forming an undulating structure layer 2 on the surface of a substrate 1, the undulating structure layer 2 at least includes a first area A with a first microstructure and a second area B with a second microstructure. On the premise of comparing with the same dimension, a depth-to-width ratio or a specific volume of the second microstructure is greater than a depth-to-width ratio or a specific volume of the first microstructure, or both the depth-to-width ratio and the specific volume of the second microstructure are correspondingly greater than the depth-to-width ratio or specific volume of the first microstructure, namely, the depth-to-width ratio of the second microstructure is greater than the depth-to-width ratio of the first microstructure, or the specific volume of the second microstructure is greater than the specific volume of the first microstructure, or the depth-to-width ratio of the second microstructure is greater than the depth-to-width ratio of the first microstructure and the specific volume of the second microstructure is greater than the specific volume of the first microstructure, as shown in FIG. 8.

The substrate 1 may be at least partially transparent, may also be a colored dielectric layer, may be a transparent medium film with a function coating layer on the surface, and may also be a multi-layer film formed by compounding. The substrate 1 is generally formed of a film material having good physical and chemical resistance and high mechanical strength, for example, a plastic film such as a polyethylene terephthalate (PET) film, a polyethylene naphthalate (PEN) film, or a polypropylene (PP) film may be used to form the substrate 1, and the substrate 1 is preferably formed of the PET material. A bonding enhancement layer may be included on the substrate 1 to enhance bonding of the substrate 1 to the undulating structure layer 2. A peeled layer may also be included on the substrate 1 to achieve separation of the substrate 1 from the undulating structure layer 2 in the final product.

The undulating structure layer 2 may be formed by performing batch copying through processing modes such as ultraviolet casting, mould pressing and nano-imprinting. For example, the undulating structure layer 2 may be formed by thermoplastic resin through a mould pressing process, that is, the thermoplastic resin coated on the substrate 1 in advance is heated to be softened and deformed when passing through a high-temperature metal template, so that a specific undulating structure is formed, and then cooling and forming are performed. The undulating structure layer 2 may also be formed by a radiation curing casting process, namely, coating a radiation curing resin on the substrate 1, pushing and pressing an original template thereon, meanwhile, irradiating radioactive rays such as ultraviolet rays or electron beams, so that the material is cured, and then the original template is removed to form the undulating structure layer 2.

For the requirement of subsequent hollowing, the depth-to-width ratio of the second microstructure is greater than the depth-to-width ratio of the first microstructure, or the specific volume of the second microstructure is greater than the specific volume of the first microstructure, or the depth-to-width ratio of the second microstructure is greater than the depth-to-width ratio of the first microstructure and the specific volume of the second microstructure is greater than the specific volume of the first microstructure. If a vapor deposition process is subsequently adopted to form a protection layer, more specifically, the depth-to-width ratio of the first microstructure is greater than or equal to 0 and smaller than 0.3, and the depth-to-width ratio of the second microstructure is greater than 0.2 and smaller than 0.5. If a coating process is subsequently adopted to form the protection layer, more specifically, the specific volume of the first microstructure is greater than or equal to 0 $um^3/um^2$ and smaller than 0.5 $um^3/um^2$, and the specific volume of the second microstructure is greater than 0.4 $um^3/um^2$ and smaller than 2 $um^3/um^2$.

Both the first microstructure and the second microstructure may be one of a periodic structure or an aperiodic structure, or a combination of the periodic structure and the aperiodic structure, the structure is one of a sinusoidal structure, a rectangular grating structure, a trapezoidal grating structure, a blazed grating structure and an arc-shaped grating structure or a combination thereof. The size and the lateral arrangement of the first microstructure and the second microstructure are determined by the desired optical effect. The first microstructure may be selected to be a flat structure.

Figure 9:
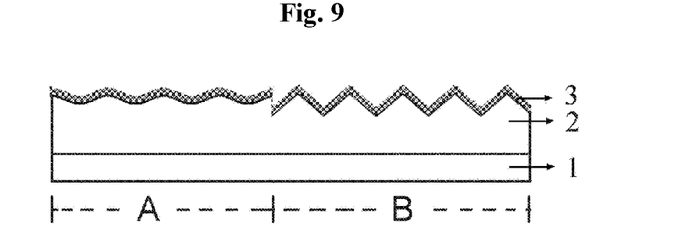
FIG. 9 is a schematic structural diagram of a cross-sectional view of the first exemplary optical anti-counterfeiting element afier forming a first plating layer according to an embodiment of the disclosure.

Step S2: a plating layer configured to obtain a first plating layer 3 is formed on the undulating structure layer 2, as shown in FIG. 9.

In the embodiment, the first plating layer 3 is selected to be a single metal reflecting plating layer. The metal reflecting plating layer is configured to improve a brightness of the optical effect formed by the microstructures. A material of the metal reflecting plating layer may be a metal such as Al, Cu, Ni, Cr, Ag. Fe, Sn, Au and Pt, or a mixture thereof or alloy thereof, and aluminum is preferable because aluminum is low in cost, high in brightness, and easy to remove through reacting with acid liquor and alkali liquor. A thickness of the metal reflecting plating layer is generally selected to be greater than 10 nm and smaller than 80 nm, more specifically, greater than 20 nm and smaller than 50 nm. If the metal reflecting plating layer is too thin, the brightness is insufficient; and if the metal reflecting plating layer is too thick, the fastness to the undulating structure layer is poor, and the cost also increases.

The first plating layer 3 may generally be formed on the undulating structure layer 2 by physical and/or chemical vapor deposition methods, for example, including, but not limited to, thermal evaporation, magnetron sputtering, MOCVD, etc. More specifically, the first plating layer 3 is formed on the undulating structure layer 2 in a conformal coverage manner with uniform surface density.

Figure 10:
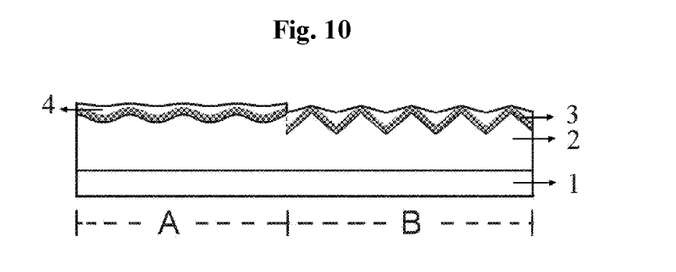
FIG. 10 is a schematic structural diagram of a cross-sectional view of the first exemplary optical anti-counterfeiting element afier forming a first protection layer according to an embodiment of the disclosure.

Step S3: a first protection layer 4 is formed, as shown in FIG. 10.

If the depth-to-width ratio of the first microstructure is smaller than the depth-to-width ratio of the second microstructure, a vapor deposition process may be used to form the first protection layer 4. If the specific volume of the first microstructure is smaller than the specific volume of the second microstructure, a coating process may be used to form the first protection layer 4. If the depth-to-width ratio of the first microstructure is smaller than the depth-to-width ratio of the second microstructure and the specific volume of the first microstructure is smaller than the specific volume of the second microstructure, both a vapor deposition process and a coating process may be used to form the first protection layer 4.

If the first protection layer 4 is formed by the vapor deposition process, a material of the first protection layer may be selected from inorganic or organic materials that may adapt to the vapor deposition process, such as $MgF_2$, Sn, Cr, ZnS, ZnO, Ni, Cu, Au, Ag, $TiO_2$, MgO, $SiO_2$, and $Al_2O_3$, and polymerizable organic compounds such as acrylate, urethane acrylate and epoxy acrylate. Particularly, the organic compounds may be used in combination with an initiator, and the organic compounds may be polymerized by radiation curing after vapor deposition. After vapor deposition, a surface topography of the protection layer is the same or substantially the same as a topography of the first plating layer. The protection layer is formed by vapor deposition in an amount sufficient to protect the first plating layer of the first area. Generally, the thickness of the vapor deposited protection layer (relative to the flat area) is greater than 20 nm.

If the first protection layer 4 is formed by the coating process, a coating amount of the protection layer is required to be such that a minimum thickness of the first protection layer 4 on the first microstructure is significantly larger than a minimum thickness on the second microstructure. The minimum thickness of the protection layer on the microstructure is generally located at the top-most of the microstructure. Thus, the first protection layer provides significantly greater protection to the first plating layer of the first area than to the first plating layer of the second area. It is generally required that a coating amount per unit area of the protection layer is greater than $0.1\ g/m^2$ and smaller than $0.6\ g/m^2$. The smaller viscosity before coating of the protection layer, the more advantageous the leveling, and therefore, a viscosity of protective glue is generally smaller than 100 cP, more specifically, smaller than 50 cP. A component of the protection layer may be varnish or ink containing polyester, polyurethane, acrylic resin, or a combination of polyester, polyurethane and acrylic resin as a main resin.

Figure 11:
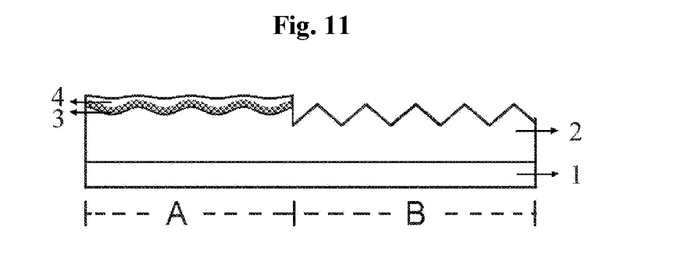
FIG. 11 is a schematic structural diagram of a cross-sectional view of the first exemplary optical anti-counterfeiting element after reacting in a corrosive atmosphere according to an embodiment of the disclosure.

Step S4: placing the multi-layer structure obtained in S3 in an atmosphere capable of reacting with the first plating layer 3 until part or the entire first plating layer 3 located in the second area B is removed, as shown in FIG. 11.

As previously described, the first protection layer 4 provides significantly greater protection to the first plating layer of the first area than to the first plating layer of the second area. Therefore, in a certain period of time, the corrosive atmosphere may reach and corrode the first plating layer through vulnerabilities of the protection layer of the second area; and in the time, the first protection layer effectively protects the first plating layer of the first area. In this way, the first plating layer accurately located on the first area is obtained. If the first plating layer is aluminum or a plating layer containing aluminum, the corrosive atmosphere may be acid liquor and alkali liquor. Generally, after the first plating layer on the second area is corroded, the first protection layer on the plating layer also lifts off. Sometimes, after the first plating layer on the second area is corroded, the first protection layer on the plating layer may partially or even completely remain on the undulating structure layer, which does not affect the implementation of the subsequent processes.

Figure 12:
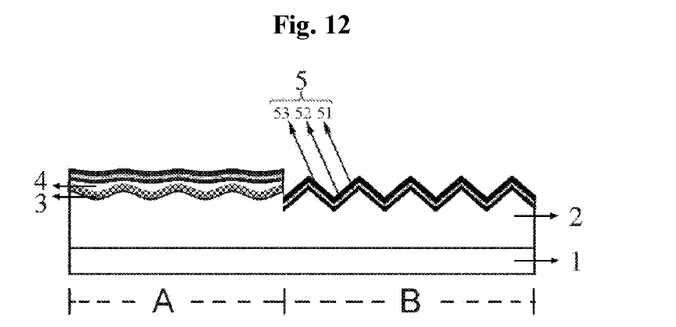
FIG. 12 is a schematic structural diagram of a cross-sectional view of the first exemplary optical anti-counterfeiting element after forming a second plating layer according to an embodiment of the disclosure.

Step S5, forming a plating layer configured to obtain a second plating layer 5, as shown in FIG. 12.

In the embodiment, the second plating layer 5 is selected to be a multi-layer interference optically variable plating layer. The multi-layer interference optically variable plating layer 5 generally consists of an absorbing layer 51, a dielectric layer 52 and a reflecting layer 53. Viewed from one side of the absorbing layer, the multi-layer interference optically variable plating layer shows different color features when viewed from different angles, and therefore, an order of formation of the multi-layer interference optically variable plating layer is generally the absorbing layer 51, the dielectric layer 52 and the reflecting layer 53. The reflecting layer is generally a thicker metal material with good reflectivity, showing non-transparent or substantially non-transparent feature in perspective observation: the dielectric layer is generally a completely transparent or substantially completely transparent compound material; and the absorbing layer is generally a thinner metal material, which shows semi-transparent feature during light transmission. The reflecting layer 53 may be composed of aluminum, silver, copper, tin, chromium, nickel, titanium, or alloy thereof, and the reflecting layer 53 is preferably aluminum because aluminum is relatively low in cost and easy to remove by acid liquor or alkali liquor: the dielectric layer 52 may be composed of $MgF_2$, $SiO_2$, ZnS, TIN, $TiO_2$, TIO, $Ti_2O_3$, $Ti_3O_5$, $Ta_2O_5$, $Nb_2O_5$, $CeO_2$, $Bi_2O_3$, $Cr_2O_3$, $Fe_2O_3$, $HfO_2$ or ZnO: the absorbing layer 53 may be composed of nickel, chromium, aluminum, silver, copper, tin, titanium or alloy thereof, and more specifically, nickel and chromium. A thickness of the reflecting layer 53 is generally selected from 10 nm to 80 nm, more specifically, 20 nm to 50 nm. A thickness of the absorbing layer 51 is generally 3-10 nm. A thickness of the dielectric layer 52 is determined by the desired optically variable colors, and is generally 200-600 nm.

At this point, a semi-finished optical anti-counterfeiting element with the first area showing the optical features of the first plating layer and the second area showing the optical features of the second plating layer is obtained. The method for manufacturing the optical anti-counterfeiting element as shown in FIG. 3 generally also includes that, after Step S5, coating the other function coating layer 7, such as anti-aging glue, to protect the optical plating layer, and/or hot melt glue, to play the role of bonding with other substrates.

A method for manufacturing an anti-counterfeiting element as shown in FIG. 4 according to the disclosure will be described below in combination with FIGS. 13-20. The method includes Steps S1' to S7'. For simplicity of description, a first plating layer is selected to be a single metal plating layer, and a second plating layer is selected to be a multi-layer interference optically variable plating layer, namely, the optical anti-counterfeiting element with the schematic structural diagram of a cross-sectional view as shown in FIG. 6 and FIG. 7.

Figure 13:
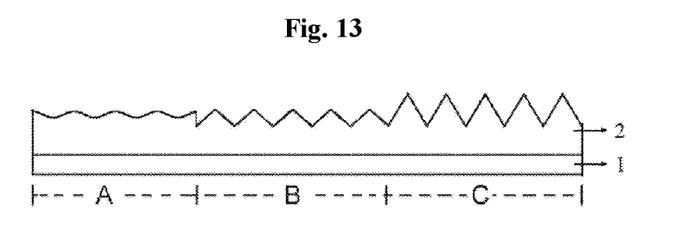
FIG. 13 is a schematic structural diagram of a cross-sectional view of the second exemplary optical anti-counterfeiting element after forming an undulating structure layer according to an embodiment of the disclosure.

Step S1': forming an undulating structure layer 2 on a surface of a substrate 1, the undulating structure layer 2 at least includes a first area A with a first microstructure, a second area B with a second microstructure and a third area C with a third microstructure, a depth-to-width ratio of the second microstructure is greater than a depth-to-width ratio of the first microstructure, or a specific volume of the second microstructure is greater than a specific volume of the first microstructure, or the depth-to-width ratio of the second microstructure is greater than the depth-to-width ratio of the first microstructure and the specific volume of the second microstructure is greater than the specific volume of the first microstructure: a depth-to-width ratio of the third microstructure is greater than the depth-to-width ratio of the second microstructure, or a specific volume of the third microstructure is greater than the specific volume of the second microstructure, or the depth-to-width ratio of the third microstructure is greater than the depth-to-width ratio of the second microstructure and the specific volume of the third microstructure is greater than the specific volume of the second microstructure, as shown in FIG. 13.

The substrate 1 may be at least partially transparent, may also be a colored dielectric layer, may be a transparent medium film with a functional coating layer on the surface, and may also be a multi-layer film formed by compounding. The substrate 1 is generally formed of a film material having good physical and chemical resistance and high mechanical strength, for example, a plastic film such as a polyethylene terephthalate (PET) film, a polyethylene naphthalate (PEN) film or a polypropylene (PP) film may be used to form the substrate 1, and the substrate 1 is preferably formed of the PET material. A bonding enhancement layer may be included on the substrate 1 to enhance bonding of the substrate 1 to the undulating structure layer 2. A peeled layer may also be included on the substrate 1 to achieve separation of the substrate 1 from the undulating structure layer 2 in the final product.

The undulating structure layer 2 may be formed by performing batch copying through processing modes such as ultraviolet casting, mould pressing and nano-imprinting. For example, the undulating structure layer 2 may be formed by thermoplastic resin through a mould pressing process, that is, the thermoplastic resin coated on the substrate 1 in advance is heated to be softened and deformed when passing through a high-temperature metal template, so that a specific undulating structure is formed, and then cooling and molding are performed. The undulating structure layer 2 may also be formed by a radiation curing casting process, namely, coating a radiation curing resin on the substrate 1, pushing and pressing an original template thereon, meanwhile, irradiating radioactive rays such as ultraviolet ray's or electron beams, so that the material is cured, and then the original template is removed to form the undulating structure layer 2.

For the requirement of subsequent hollowing, the depth-to-width ratio of the second microstructure is greater than the depth-to-width ratio of the first microstructure, or the specific volume of the second microstructure is greater than the specific volume of the first microstructure, or the depth-to-width ratio of the second microstructure is greater than the depth-to-width ratio of the first microstructure and the specific volume of the second microstructure is greater than the specific volume of the first microstructure: the depth-to-width ratio of the third microstructure is greater than the depth-to-width ratio of the second microstructure, or the specific volume of the third microstructure is greater than the specific volume of the second microstructure, or the depth-to-width ratio of the third microstructure is greater than the depth-to-width ratio of the second microstructure and the specific volume of the third microstructure is greater than the specific volume of the second microstructure. If a vapor deposition process is subsequently adopted to form the protection layer, more specifically, the depth-to-width ratio of the first microstructure is greater than or equal to 0 and smaller than 0.3, the depth-to-width ratio of the second microstructure is greater than 0.2 and smaller than 0.5, and the specific volume of the third microstructure is greater than 0.3 and smaller than 1. If a coating process is subsequently adopted to form the protection layer, more specifically, the specific volume of the first microstructure is greater than or equal to 0 $um^3/um^2$ and smaller than 0.5 $um^3/um^2$, the specific volume of the second microstructure is greater than 0.4 $um^3/um^2$ and smaller than 2 $um^3/um^2$, and the specific volume of the third microstructure is greater than 1 $um^3/um^2$ and smaller than 3 $um^3/um^2$.

The first microstructure, the second microstructure and the third microstructure may be one of a periodic structure or an aperiodic structure, or a combination of the periodic structure and the aperiodic structure, the structure is one of a sinusoidal structure, a rectangular grating structure, a trapezoidal grating structure, a blazed grating structure and an arc-shaped grating structure or a combination thereof. The size and the lateral arrangement of the first microstructure and the second microstructure are determined by the desired optical effects. The first microstructure may be selected to be a flat structure. The third microstructure is generally only configured for hollowing out and does not provide an additional optical effect, so that the third microstructure may be simplified, for example, the third microstructure is a blazed grating which is arranged in one dimension, and has an isosceles triangle-shaped cross section with the width being 10 μm and the height being 5 um (namely, the depth-to-width ratio is 0.5, and the specific volume is 2.5 $um^3/um^2$).

Figure 14:
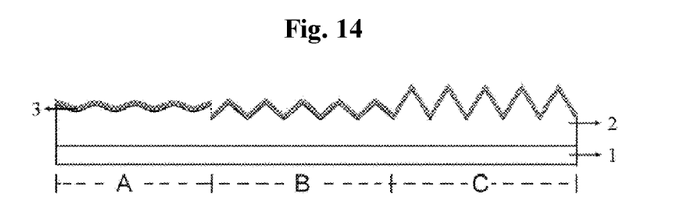
FIG. 14 is a schematic structural diagram of a cross-sectional view of the second exemplary optical anti-counterfeiting element after forming a first plating layer according to an embodiment of the disclosure.

Step S2': forming a plating layer configured to obtain a first plating layer 3 on the undulating structure layer 2, as shown in FIG. 14.

In the embodiment, the first plating layer 3 is selected to be a single metal reflecting plating layer. The metal reflecting plating layer is configured to improve a brightness of the optical effect formed by the microstructures. The material of the metal reflecting plating layer may be a metal such as Al, Cu, Ni, Cr, Ag, Fe, Sn, Au, Pt, or a mixture thereof or alloy thereof, and aluminum is preferable because aluminum is low in cost, high in brightness, and easy to remove through reacting with acid liquor and alkali liquor. A thickness of the metal reflecting plating layer is generally selected to be greater than 10 nm and smaller than 80 nm, more specifically, greater than 20 nm and smaller than 50 nm. If the metal reflecting plating layer is too thin, the brightness is insufficient; and if the metal reflecting plating layer is too thick, the fastness to the undulating structure layer is poor, and the cost also increases. The first plating layer 3 or a sub-plating layer therefore may be formed on the undulating structure layer 2 by physical and/or chemical vapor deposition methods, for example, including, but not limited to, thermal evaporation, magnetron sputtering, MOCVD, etc. More specifically, the first plating layer 3 is formed on the undulating structure layer 2 in a conformal coverage manner with uniform surface density.

Figure 15:
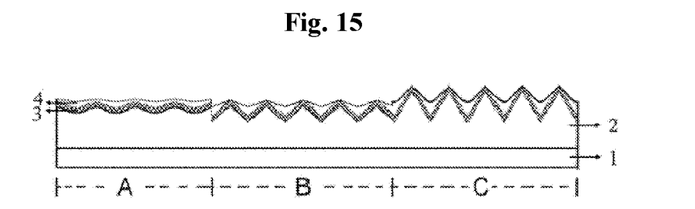
FIG. 15 is a schematic structural diagram of a cross-sectional view of the second exemplary optical anti-counterfeiting element after forming a first protection layer according to an embodiment of the disclosure.

Step S3': forming a first protection layer 4, as shown in FIG. 15.

If the depth-to-width ratio of the first microstructure is smaller than the depth-to-width ratios of the second microstructure and the third microstructure, a vapor deposition process may be used to form the first protection layer 4. If the specific volume of the first microstructure is smaller than the specific volumes of the second microstructure and the third microstructure, a coating process may be used to form the first protection layer 4. If the depth-to-width ratio of the first microstructure is smaller than the depth-to-width ratio of the second microstructure and the third microstructure and the specific volume of the first microstructure is smaller than the specific volumes of the second microstructure and the third microstructure, both the vapor deposition process and the coating process may be used to form the first protection layer 4.

If the first protection layer 4 is formed by the vapor deposition process, the material of the first protection layer may be selected from inorganic or organic materials that may adapt to the vapor deposition process, such as $MgF_2$, Sn, Cr, ZnS, ZnO, Ni, Cu, Au, Ag, $TiO_2$, MgO, $SiO_2$, and $Al_2O_3$, and polymerizable organic compounds such as acrylate, urethane acrylate and epoxy acrylate. In particular, the organic compounds may be used in combination with an initiator, and the organic compounds may be polymerized by radiation curing after vapor deposition. After vapor deposition, a surface topography of the protection layer is the same or substantially the same as a topography of the first plating layer. The protection layer is formed by vapor deposition in an amount sufficient to protect the first plating layer of the first area. Generally, a thickness of the vapor deposited protection layer (relative to the flat area) is greater than 20 nm.

If the first protection layer 4 is formed by the coating process, the coating amount of the protection layer is required to be such that a minimum thickness of the first protection layer 4 on the first microstructure is significantly larger than a minimum thickness on the second microstructure and the third microstructure. The minimum thickness of the protection layer on the microstructure is generally located at the top-most of the microstructure. Thus, the first protection layer provides significantly greater protection to the first plating layer of the first area than to the first plating layers in the second area and the third area. It is generally required that the coating amount per unit area of the protection layer is greater than 0.1 $g/m^2$ and smaller than 0.6 $g/m^2$. The smaller the viscosity before application of the protection layer, the more advantageous the leveling, and therefore, the viscosity of protective glue is generally smaller than 100 cP, more specifically, smaller than 50 cP. The component of the protection layer may be varnish or ink containing polyester, polyurethane, acrylic resin, or a combination of polyester, polyurethane and acrylic resin as a main resin.

Figure 16:
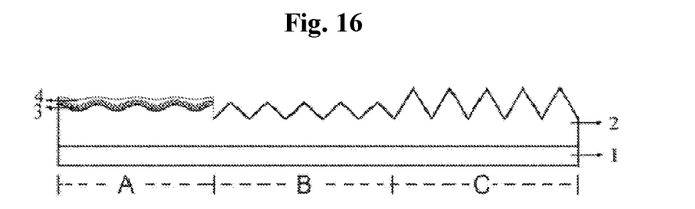
FIG. 16 is a schematic structural diagram of a cross-sectional view of the second exemplary optical anti-counterfeiting element afier first reacting in a corrosive atmosphere according to an embodiment of the disclosure after first reaction in a corrosive atmosphere.

Step S4': placing the multi-layer structure obtained in Step S3' in an atmosphere capable of reacting with the first plating layer 3 until part or all of the first plating layer 3 located in the second area B and the third area C is removed, as shown in FIG. 16. As previously described, the first protection layer 4 provides significantly greater protection to the first plating layer of the first area than to the first plating layers of the second areas and the third areas. Therefore, in a certain period of time, the corrosive atmosphere may reach and corrode the first plating layer through vulnerabilities of the protection layers of the second areas and the third areas; and in the time, the first protection layer effectively protects the first plating layer of the first area. In this way, the first plating layer accurately located on the first area is obtained. If the first plating layer is aluminum or a plating layer containing aluminum, the corrosive atmosphere may be acid liquor or alkali liquor. Generally, after the first plating layers on the second area and the third area are corroded, the first protection layer on the plating layer also lifts off. Sometimes, after the first plating layers on the second area and the third area are corroded, the first protection layer on the plating layer may partially or even completely remain on the undulating structure layer, which does not affect the implementation of the subsequent processes.

Figure 17:
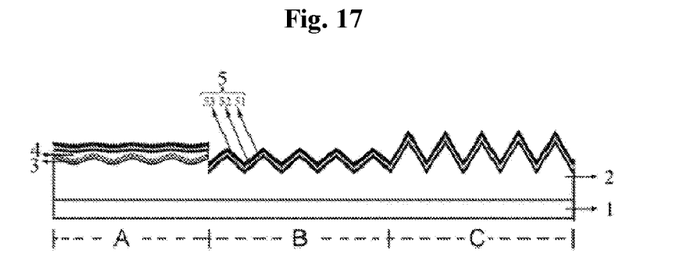
FIG. 17 is a schematic structural diagram of a cross-sectional view of the second exemplary optical anti-counterfeiting element after forming a second plating layer according to an embodiment of the disclosure.

Step S5': forming a plating layer configured to obtain a second plating layer 5, as shown in FIG. 17.

In the embodiment, the second plating layer 5 is selected to be a multi-layer interference optically variable plating layer. The multi-layer interference optically variable plating layer 5 generally consists of an absorbing layer 51, a dielectric layer 52 and a reflecting layer 53. Viewed from one side of the absorbing layer, the multi-layer interference optically variable plating layer shows different color features when viewed from different angles, and therefore, the order of formation of the multi-layer interference optically variable plating layer is generally the absorbing layer 51, the dielectric layer 52 and the reflecting layer 53. The reflecting layer is generally a thicker metal material with good reflectivity and shows non-transparent or substantially non-transparent feature during light transmission: the dielectric layer is generally a completely transparent or substantially completely transparent compound material; and the absorbing layer is generally a thinner metal material, which shows semi-transparent feature during light transmission. The reflecting layer 53 may be composed of aluminum, silver, copper, tin, chromium, nickel, titanium, or alloy thereof, and the reflecting layer 53 is preferably aluminum because aluminum is relatively low in cost and easy to remove by acid liquor or alkali liquor: the dielectric layer 52 may be composed of $MgF_2$, $SiO_2$, ZnS, TIN, $TiO_2$, TIO, $Ti_2O_3$, $Ti_3O_5$, $Ta_2O_5$, $Nb_2O_5$, $CeO_2$, $Bi_2O_3$, $Cr_2O_3$, $Fe_2O_3$, $HfO_2$ or ZnO; and the absorbing layer 51 may be composed of nickel, chromium, aluminum, silver, copper, tin, titanium or alloy thereof, and more specifically, nickel and chromium. A thickness of the reflecting layer 53 is generally selected from 10 nm to 80 nm, more specifically, 20 nm to 50 nm. A thickness of the absorbing layer 51 is generally 3-10 nm. A thickness of the dielectric layer 52 is determined by required color features, and is generally 200-600 nm.

Figure 18:
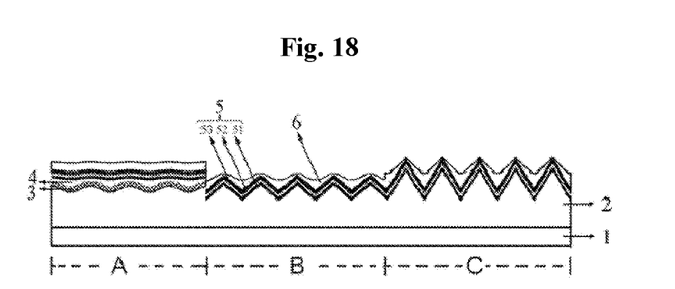
FIG. 18 is a schematic structural diagram of a cross-sectional view of the second exemplary optical anti-counterfeiting element after forming a second protection layer according to an embodiment of the disclosure.

Step S6': forming a second protection layer 6, as shown in FIG. 18.

If the depth-to-width ratio of the second microstructure is smaller than the depth-to-width ratio of the third microstructure, a vapor deposition process may be used to form the second protection layer 6. If the specific volume of the second microstructure is smaller than the specific volume of the third microstructure, a coating process may be used to form the second protection layer 6. If the depth-to-width ratio of the second microstructure is smaller than the depth-to-width ratio of the third microstructure and the specific volume of the second microstructure is smaller than the specific volume of the third microstructure, both the vapor deposition process and the coating process may be used to form the second protection layer 6. The first protection layer 6 is formed in an amount such that the protection layer forms effective protection for the second plating layer 5 of the second area B and does not form effective protection for the second plating layer 5 of the third area C. The material and process requirements for forming the second protection layer 6 are consistent with the material and process requirements for forming the first protection layer 4. The details will not be elaborated herein.

Figure 19:
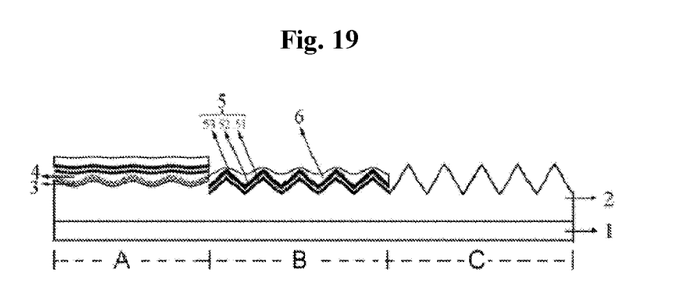
FIG. 19 is a schematic structural diagram of a cross-sectional view of the second exemplary optical anti-counterfeiting element after second reacting in a first corrosive atmosphere according to an embodiment of the disclosure.
Figure 20:
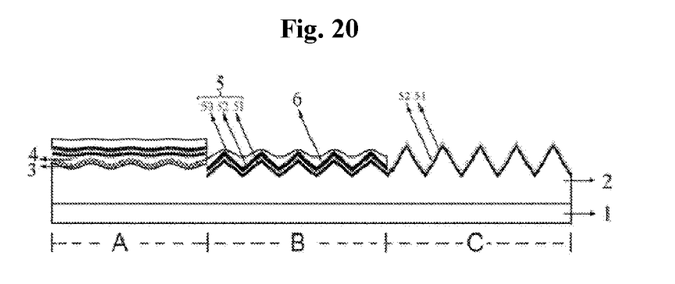
FIG. 20 is a schematic structural diagram of a cross-sectional view of the second exemplary optical anti-counterfeiting element after second reacting in a second corrosive atmosphere according to an embodiment of the disclosure.

Step S7': placing the multi-layer structure obtained in Step S6' in an atmosphere capable of reacting with the second plating layer 5 until part or all of the second plating layer 5 located in the third area C is removed, as shown in FIG. 19 and FIG. 20.

As previously described, the first protection layer 6 provides significantly greater protection to the second plating layer of the second area B than to the second plating layer of the third area C. Therefore, in a certain period of time, the corrosive atmosphere may reach and corrode the second plating layer through vulnerabilities of the protection layer of the third area; and in the time, the second protection layer 6 effectively protects the second plating layer of the second area. In this way, the second plating layer accurately located on the second area is obtained. Generally, the second plating layer in the first area may also be retained, but in the final product, the optical effect is not provided due to the shielding of the first plating layer. If the second plating layer is a plating layer containing aluminum, the corrosive atmosphere may be acid liquor or alkali liquor. Generally, after the second plating layer on the third area is corroded, the second protection layer on the plating layer also lifts off. Sometimes, after the second plating layer on the third area is corroded, the second protection layer on the plating layer may partially or even completely remain on the undulating structure layer, which does not affect the implementation of the subsequent processes.

In the embodiment, the second plating layer 5 is selected to be a multi-layer interference optically variable plating layer. The multi-layer interference optically variable plating layer 5 consists of an absorbing layer 51, a dielectric layer 52 and a reflecting layer 53.

If the absorbing layer 51 may react with a corrosive atmosphere, for example, the reflecting layer and the absorbing layer are both aluminum, the corrosive atmosphere is acid liquor, then the corrosive atmosphere may react with the absorbing layer 51 through vulnerabilities of the dielectric layer 52, then the third area C does not remain any plating layer components, so that a completely or substantially completely transparent feature is shown, as shown in FIG. 19. If the absorbing layer 51 does not react with the corrosive atmosphere, for example, the reflecting layer 53 is aluminum, the absorbing layer 51 is nickel, the corrosive atmosphere is acid liquor, then the corrosive atmosphere only reacts with the reflecting layer 53, then the absorbing layer and the dielectric layer may remain on the third area C, and therefore, a semitransparent feature is shown, as shown in FIG. 20.

The method for manufacturing the optical anti-counterfeiting element as shown in FIG. 6 and FIG. 7 generally also includes that, after Step S7', coating the other function coating layer 7, such as anti-aging glue, to protect the optical plating layer, and/or hot melt glue, to bond with other substrates. The method for manufacturing the optical anti-counterfeiting element according to the disclosure is suitable for manufacturing security strips with windows, labels, logos, wide strips, transparent windows, films, and the like. Anti-counterfeiting paper with the window security threads is configured for anti-counterfeiting of various high-security products such as banknotes, passports and securities.

Alternative implementation modes of the embodiments of the disclosure are described in detail above with reference to the drawings, but the embodiments of the disclosure are not limited to specific details in the above implementation modes, various simple modifications may be made to the technical solutions of the embodiments of the disclosure within the scope of the technical idea of the embodiments of the disclosure, and these simple modifications all fall within the scope of protection of embodiments of the disclosure.

It is further noted that the various specific technical features described in the above detailed implementation modes may be combined in any suitable manner without contradiction. In order to avoid unnecessary repetition, the various possible combinations of the embodiments of the disclosure are not otherwise described.

Those skilled in the art should understand that all or part of the steps in the methods for implementing the embodiments may be completed by instructing related hardware through a program, and the program is stored in a storage medium, and includes a plurality of instructions enabling a single-chip microcomputer, chip, or processor to perform all or part of the steps of the methods described in the embodiments of the disclosure. The foregoing storage medium includes any medium that can store program code, such as a U disk, a removable hard disk, a Read-Only Memory (ROM), a Random Access Memory (RAM), a magnetic disk, or an optical disc.

In addition, any combination of the various implementation modes of the embodiments of the disclosure may also be made, which should also be considered as disclosed as long as they do not depart from the idea of the embodiments of the disclosure.

What is claimed is:

1. An optical anti-counterfeiting element, comprising:
    an undulating structure layer, wherein the undulating structure layer comprises a first area with a first microstructure, and a second area with a second microstructure; a structural parameter of the second microstructure is greater than a structural parameter of the first microstructure, or a structural secondary parameter of the second microstructure is greater than a structural secondary parameter of the first microstructure;
    a first plating layer, wherein the first plating layer is arranged on the first area;
    a second plating layer, wherein the second plating layer is arranged on the first area and the second area;
    a first protection layer, wherein the first protection layer is located between the first plating wherein the first plating layer and the first microstructure show a combined optical feature in the first area; and the second plating layer and the second microstructure show a combined optical feature in the second area;

the structural parameter is a parameter selected from a depth-to-width ratio and a specific volume; and the structural secondary parameter is a remaining parameter in the depth-to-width ratio and the specific volume.

2. The optical anti-counterfeiting element according to claim 1, wherein the first microstructure or the second microstructure is one of a periodic structure or an aperiodic structure; or the first microstructure or the second microstructure is a combination of the periodic structure and the aperiodic structure; and a cross section structure of the first microstructure or the second microstructure along an extension direction is one of a flat structure, a sinusoidal structure, a rectangular grating structure, a trapezoidal grating structure, a blazed grating structure and an arc-shaped grating structure; or the cross section structure of the first microstructure or the second microstructure along an extension direction is a structure formed by combining at least any two of the flat structure, the sinusoidal structure, the rectangular grating structure, the trapezoidal grating structure, the blazed grating structure and the arc-shaped grating structure.

3. The optical anti-counterfeiting element according to claim 1, wherein the structural parameter is the depth-to-width ratio;

a range of a depth-to-width ratio of the first microstructure is greater than or equal to 0 and smaller than 0.3; and a range of a depth-to-width ratio of the second microstructure is greater than 0.2 and smaller than 0.5.

4. The optical anti-counterfeiting element according to claim 1, wherein the structural parameter is the specific volume;

a range of a specific volume of the first microstructure is greater than or equal to 0 um3/um2 and smaller than 0.5 um3/um2; and a range of a specific volume of the second microstructure is greater than 0.4 um3/um2 and smaller than 2 um3/um2.

5. The optical anti-counterfeiting element according to claim 1, wherein both the first plating layer and the second plating layer are metal reflecting plating layers; or both the first plating layer and the second plating layer are multi-layer interference optically variable plating layers; or the first plating layer is a metal reflecting plating layer, and the second plating layer is a multi-layer interference optically variable plating layer; or the first plating layer is the multi-layer interference optically variable plating layer, and the second plating layer is the metal reflecting plating layer.

6. The optical anti-counterfeiting element according to claim 5, wherein a material of the metal reflecting plating layer comprises one of aluminum, silver, copper, tin, chromium, nickel and titanium, or the material of the metal reflecting plating layer comprises an alloy formed by combining at least any two of aluminum, silver, copper, tin, chromium, nickel and titanium.

7. The optical anti-counterfeiting element according to claim 5, wherein the multi-layer interference optically variable plating layer comprises a reflecting layer, a dielectric layer and an absorbing layer;

a material of the reflecting layer comprises one of aluminum, silver, copper, tin, chromium, nickel and titanium, or an alloy formed by combining at least any two of aluminum, silver, copper, tin, chromium, nickel and titanium;

a material of the dielectric layer comprises magnesium fluoride, silicon dioxide, zinc sulfide, titanium nitride, titanium dioxide, titanium monoxide, dititanium trioxide, trititanium pentoxide, tantalum pentoxide, niobium pentoxide, cerium dioxide, bismuth trioxide, chromic oxide, iron oxide, hafnium dioxide or zinc oxide; and a material of the absorbing layer comprises one of nickel, chromium, aluminum, silver, copper, tin and titanium, or an alloy formed by combining at least any two of nickel, chromium, aluminum, silver, copper, tin and titanium.

8. The optical anti-counterfeiting element according to claim 1, wherein the undulating structure layer further comprises a third area with a third microstructure;

a structural parameter of the third microstructure is greater than a structural parameter of the second microstructure;

the third area is not provided with the first plating layer or the second plating layer; and during transmission observation, the third area has a hollow feature relative to the first area and the second area.

9. The optical anti-counterfeiting element according to claim 8, wherein the structural parameter is a depth-to-width ratio; and a range of the depth-to-width ratio of the third microstructure is greater than 0.3 and smaller than 1.

10. The optical anti-counterfeiting element according to claim 8, wherein the structural parameter is a specific volume; and a range of the specific volume of the third microstructure is greater than 1 um3/um2 and smaller than 3 um3/um2.

11. The optical anti-counterfeiting element according to claim 8, wherein one of the first plating layer and the second plating layer is a multi-layer interference optically variable plating layer; and the multi-layer interference optically variable plating layer comprises a reflecting layer, a dielectric layer and an absorbing layer.

12. The optical anti-counterfeiting element according to claim 11, wherein the third area is not provided with any of the reflecting layer, the dielectric layer, or the absorbing layer.

13. The optical anti-counterfeiting element according to claim 11, wherein the third area is provided with the absorbing layer and the dielectric layer, but is not provided with the reflecting layer.

14. A method of manufacturing an optical anti-counterfeiting element, comprising:

step s1: forming an undulating structure layer, wherein the undulating structure layer comprises a first area and a second area, the first area has a first microstructure and the second area has a second microstructure, and the second microstructure has a feature that a structural parameter of the second microstructure is greater than a structural parameter of the first microstructure;

step s2: forming a plating layer configured to obtain a first plating layer;

step s3: forming a first protection layer;

step s4: placing a semi-finished product formed in See step s3 in an atmosphere capable of reacting with a plating layer formed in step s2 until part or all of the plating layer formed in step s2 in the second area is removed, so that after the reaction is stopped, the first plating layer is obtained, and the first plating layer and the first microstructure show a combined optical feature in the first area; and step s5: forming a second plating layer.

15. The method of manufacturing the optical anti-counterfeiting element according to claim 14, wherein in step s4,
the undulating structure layer further comprises a third area, the third area has a third microstructure, and the third microstructure has a feature that a structural parameter of the third microstructure is greater than the structural parameter of the second microstructure.

16. The method of manufacturing the optical anti-counterfeiting element according to claim 15, further comprising:
step s6, forming a second protection layer; and
step s7, placing a product formed in ep-step step s6 in an atmosphere capable of reacting with a plating layer formed in step s5 until part or all of the plating layer formed in step s5 in the third area is removed, so that after the reaction is stopped, the second plating layer is obtained, the second plating layer and the second microstructure show a combined optical feature in the second area, and during transmission observation, the third area has a hollow feature relative to the first area and the second area.

17. The method of manufacturing the optical anti-counterfeiting element according to claim 16, wherein
the plating layer configured to obtain the first plating layer in step s2 is provided with an aluminum layer, or the plating layer configured to obtain the second plating layer in step s5 is provided with an aluminum layer, or both the plating layer configured to obtain the first plating layer in step s2 and the plating layer configured to obtain the second plating layer in step s5 are provided with aluminum layers; and an atmosphere capable of reacting with the plating layer in step s2 is selected as acid liquor or alkali liquor, or an atmosphere capable of reacting with the plating layer in Step step s5 is selected as acid liquor or alkali liquor, or both the atmosphere capable of reacting with the plating layer in step s2 and the atmosphere capable of reacting with the plating layer in step s5 are selected as acid liquor or alkali liquor.

18. The method of manufacturing the optical anti-counterfeiting element according to claim 14, wherein in step s1,
the second microstructure has a feature that a structural secondary parameter of the second microstructure is greater than a structural secondary parameter of the first microstructure;

the structural parameter is a parameter selected from a depth-to-width ratio and a specific volume; and the structural secondary parameter is a remaining parameter in the depth-to-width ratio and the specific volume.

19. The method of manufacturing the optical anti-counterfeiting element according to claim 14, further comprising:
applying an inorganic or organic plating layer, or an inorganic or organic coating process, so that an additional optical anti-counterfeiting function or an auxiliary function is realized.

* * * * *